US012628115B2

(12) United States Patent (10) Patent No.: US 12,628,115 B2
Yu et al. (45) Date of Patent: May 12, 2026

(54) TRACKING SYSTEM AND TRACKING METHOD

(71) Applicant: HTC Corporation, Taoyuan City (TW)

(72) Inventors: Kuan-Hsun Yu, Taoyuan City (TW); Wen-Shan Yang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 646 days.

(21) Appl. No.: 18/153,373

(22) Filed: Jan. 12, 2023

(65) Prior Publication Data

US 2024/0244575 A1 Jul. 18, 2024

(51) Int. Cl.
*H04W 64/00* (2009.01)
*G01S 19/47* (2010.01)

(52) U.S. Cl.
CPC ........... *H04W 64/006* (2013.01); *G01S 19/47* (2013.01)

(58) Field of Classification Search
CPC ....... H04W 4/40; H04W 64/00; H04W 4/025; H04W 4/027; H04W 4/029; H04W 4/023; H04W 4/48; H04W 64/003; H04W 4/026; H04W 12/63; H04W 4/33; H04W 36/32; H04W 36/324; H04W 52/0251; H04W 40/20; G06F 3/011; G06F 3/0346; G06F 16/29; G06F 21/36; G06F 11/3065
See application file for complete search history.

(56) References Cited

U.S. PATENT DOCUMENTS

| | | | | |
|---|---|---|---|---|
| 9,357,054 | B1 * | 5/2016 | Froment | ........... H04M 1/72454 |
| 10,719,125 | B2 * | 7/2020 | Steedly | ................. G06F 3/0308 |
| 2018/0081426 | A1 * | 3/2018 | Rothkopf | ................ G06F 3/012 |
| 2019/0018411 | A1 * | 1/2019 | Herbach | ................. G06T 11/60 |
| 2020/0169855 | A1 * | 5/2020 | Cohen | ................... H04W 4/026 |
| 2023/0098910 | A1 * | 3/2023 | Ma | ........................ G02B 27/017 |
| | | | | 345/8 |

* cited by examiner

*Primary Examiner* — Kwasi Karikari
(74) *Attorney, Agent, or Firm* — JCIPRNET

(57) ABSTRACT

A tracking system is provided. The tracking system includes a first tracking device, a second tracking device, and a wearable tracking device. The first tracking device is disposed on a vehicle and is configured to obtain map information and first measurement information. The second tracking device is disposed on the vehicle and is configured to obtain second measurement information. The wearable tracking device is disposed on a user in the vehicle and is configured to obtain third measurement information. Further, the wearable tracking device is configured to obtain location position information of the user based on the map information, the first measurement information, the second measurement information, and the third measurement information. Furthermore, the local position information indicates a user position of the user within the vehicle.

18 Claims, 5 Drawing Sheets

Obtaining, through a first tracking device disposed on a vehicle, map information and first measurement information ──S610

Obtaining, through a second tracking device disposed on the vehicle, second measurement information ──S620

Obtaining, through a wearable tracking device disposed on a user in the vehicle, third measurement information ──S630

Obtaining local position information of the user based on the map information, the first measurement information, the second measurement information, and the third measurement information ──S640

600

200

300A

300B

400

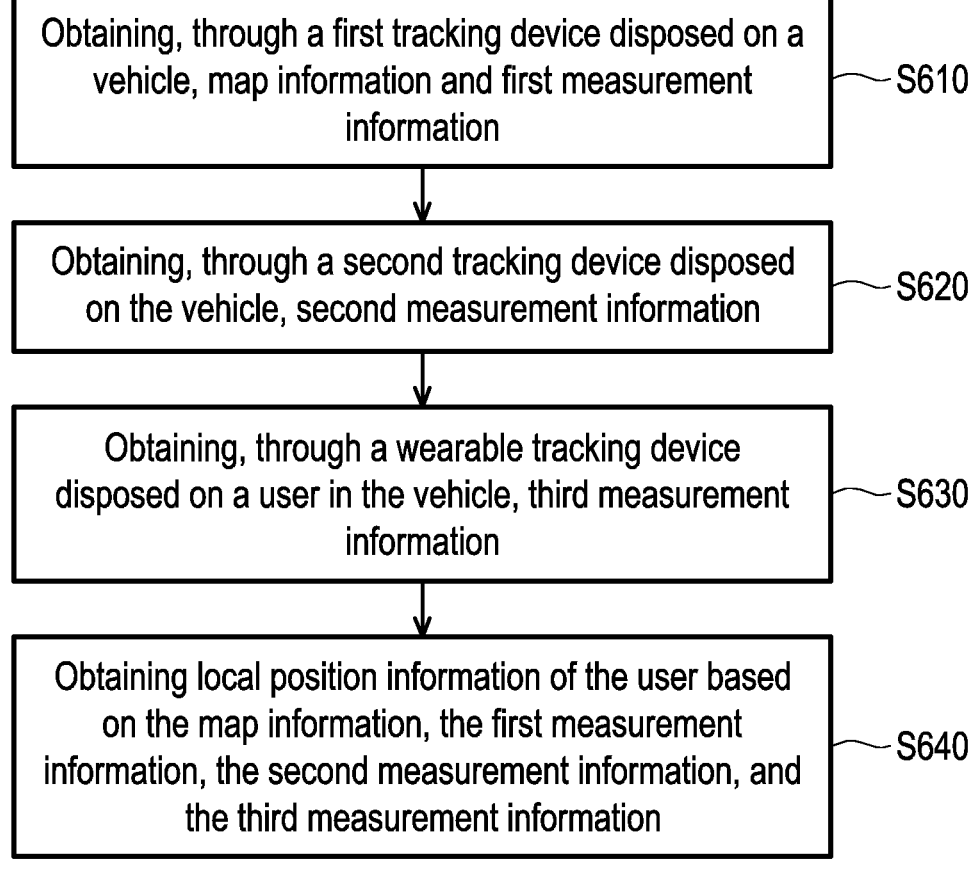

Obtaining, through a first tracking device disposed on a vehicle, map information and first measurement information — S610

Obtaining, through a second tracking device disposed on the vehicle, second measurement information — S620

Obtaining, through a wearable tracking device disposed on a user in the vehicle, third measurement information — S630

Obtaining local position information of the user based on the map information, the first measurement information, the second measurement information, and the third measurement information — S640

TRACKING SYSTEM AND TRACKING METHOD

BACKGROUND

Technical Field

The disclosure relates to a tracking system; particularly, the disclosure relates to a tracking system and a tracking method.

Description of Related Art

In order to bring an immersive experience to users, various technologies, such as augmented reality (AR) and virtual reality (VR), are constantly being developed. AR technology allows users to bring virtual elements to the real-world. VR technology allows users to enter a whole new virtual world to experience a different life. Wearable devices are often used to provide this kind of immersive experience.

In addition, to provide an immersive in-vehicle user experience, a wearable device is further integrated with a vehicle. For the purpose of the integration, the wearable device may obtain information from the vehicle by communicating with the advanced driver assistance system (ADAS). That is, the wearable device may obtain either engine status from the engine of the vehicle or may obtain tracking information from the tracking system of the vehicle. However, the setup of the integration is usually complicated and not user-friendly. Further, the tracking system of the vehicle might be expensive.

SUMMARY

The disclosure is direct to a tracking system and a tracking method, so as to track a position of a wearable device inside a vehicle.

In this disclosure, a tracking system is provided. The tracking system includes a first tracking device, a second tracking device, and a wearable tracking device. The first tracking device is disposed on a vehicle and is configured to obtain map information and first measurement information. The second tracking device is disposed on the vehicle and is configured to obtain second measurement information. The wearable tracking device is disposed on a user in the vehicle and is configured to obtain third measurement information. Further, the wearable tracking device is configured to obtain location position information of the user based on the map information, the first measurement information, the second measurement information, and the third measurement information. Furthermore, the local position information indicates a user position of the user within the vehicle.

In this disclosure, a tracking method is provided. The tracking method includes: obtaining, through a first tracking device disposed on a vehicle, map information and first measurement information; obtaining, through a second tracking device disposed on the vehicle, second measurement information; obtaining, through a wearable tracking device disposed on a user in the vehicle, third measurement information; and obtaining local position information of the user based on the map information, the first measurement information, the second measurement information, and the third measurement information, wherein the local position information indicates a user position of the user within the vehicle.

Based on the above, according to the tracking system and the tracking method, a user friendly and low cost integration system of the wearable device in the vehicle is achieved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6 is a schematic flowchart of a tracking method according to an embodiment of the disclosure.

DESCRIPTION OF THE EMBODIMENTS

Figure 1:
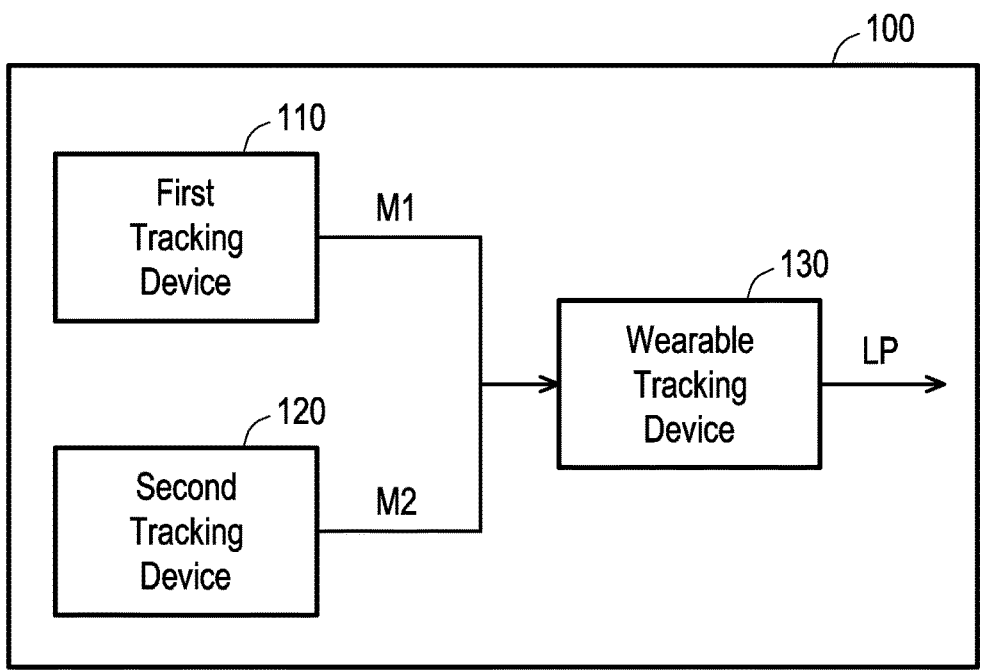
FIG. 1 is a schematic diagram of a tracking system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to users, various technologies, such as augmented reality (AR) and virtual reality (VR), are constantly being developed. AR technology allows users to bring virtual elements to the real-world. VR technology allows users to enter a whole new virtual world to experience a different life. Wearable devices are often used to provide this kind of immersive experience.

In addition, to provide an immersive in-vehicle user experience, a wearable device is further integrated with a vehicle. It is noted that, while the vehicle is moving, the sensor of the wearable device in the vehicle may also generates sensing values that indicates the wearable device is moving. However, the wearable device may stay still while the sensing values are generated. Therefore, there is a need to integrating the wearable device with the vehicle to prevent the false detection.

For the purpose of the integration, the wearable device may obtain information from the vehicle by communicating with the advanced driver assistance system (ADAS). That is, the wearable device may obtain either engine status from the engine of the vehicle or may obtain tracking information from the tracking system of the vehicle. However, the setup of the integration is usually complicated and not user-friendly. Further, the tracking system of the vehicle might be expensive. Hence, how to develop a user friendly and low cost integration system of the wearable device in the vehicle is becoming an issue to work on.

FIG. 1 is a schematic diagram of a tracking system according to an embodiment of the disclosure. With reference to FIG. 1, a tracking system 100 includes a first tracking device 110, a second tracking device 120, and a wearable tracking device 130. The first tracking device is disposed on a vehicle (not shown) and is configured to obtain map information and first measurement information M1. The second tracking device 120 is disposed on the vehicle and is configured to obtain second measurement information M2. The wearable tracking device 130 is disposed on a user (not shown) in the vehicle and is configured to obtain third measurement information. Further, the wearable tracking device 130 is configured to obtain location position information LP of the user based on the map information, the first measurement information M1, the second measurement information M2, and the third measurement information. Furthermore, the local position information LP indicates a user position of the user within the vehicle.

It is noted that, the first tracking device 110 may be mounted rigidly on a fixed position of the vehicle that stays still while the vehicle is moving. For example, the first tracking device 110 may be mounted on the bonnet of the vehicle, the glovebox of the vehicle, or the windscreen of the vehicle, but this disclosure is not limited thereto. Further, the second tracking device 120 may be mounted rigidly on a fixed position within the vehicle that stays still while the vehicle is moving. In addition, the second tracking device 120 on the fixed position is able to be detected by the wearable tracking device 130. Furthermore, the wearable tracking device 130 is disposed on the user in the vehicle.

In one embodiment, the vehicle includes, for example, a car, a bus, a bumper car, an amusement facility, a full flight simulator, or other similar objects capable of carrying people. This disclosure is not limited thereto.

In one embodiment, the tracking system 100 may include a controller. The controller may be disposed in the first tracking device 110, the second tracking device 120, the wearable tracking device 130, or other devices according to design need. While it is assumed in the following embodiments for the sake of convenience in explanation that the controller is disposed in the wearable tracking device 130, it is to be noted that the controller is not limited to being disposed in the wearable tracking device 130.

In one embodiment, the controller includes, for example, a microcontroller unit (MCU), a central processing unit (CPU), a microprocessor, a digital signal processor (DSP), a programmable controller, a programmable logic device (PLD), other similar devices, or a combination of the devices. The disclosure is not limited thereto. In addition, in an embodiment, each of functions of the controller may be achieved as multiple program codes. The program codes are stored in a memory, and executed by the controller. Alternatively, in an embodiment, each of the functions of the controller may be achieved as one or more circuits. The disclosure does not limit the use of software or hardware to achieve the functions of the controller.

In one embodiment, each of the first tracking device 110, the second tracking device 120, and the wearable tracking device 130 may include a sensor. In one embodiment, the sensor includes, for example, an inertial measurement unit (IMU) sensor, an accelerometer, a gyroscope, other similar devices, or a combination of these devices. This disclosure is not limited thereto. In one embodiment, each of the first measurement information M1, the second measurement information M2, and the third measurement information may include an inertial measurement value of an IMU sensor. Each of the inertial measurement value may include changes in six degrees of freedom (DOF) and the six degrees of freedom comprises three translation values corresponding to three perpendicular axes and three rotation values corresponding to the three perpendicular axes. For example, the inertial measurement value includes three linear accelerations and three angular velocities. However, this disclosure is not limited thereto.

In one embodiment, the second tracking device 120 includes, for example, a tracker, a light emitting device (LED), or other similar devices capable of providing a tracker pattern for the wearable tracking device 130 to detect/recognize. For example, a plurality of LEDs of the second tracking device 120 may be arranged in a specific pattern. However, this disclosure is not limited thereto. In one embodiment, the tracker pattern includes, for example, at least one of a predetermined pattern, an ava group of the university of Cordoba (ArUco) marker, and a light emitting device, but this disclosure is not limited thereto.

In one embodiment, the wearable tracking device 130 includes, for example, a wearable head-mounted display (HMD), wearable glasses (e.g., AR/VR goggles), a graspable device (e.g., handheld device), an electronic device, other similar devices, or a combination of these devices. However, the disclosure is not limited thereto.

In this manner, the tracking system 100 is able to determine the position of the user in the vehicle while the vehicle is moving. Therefore, the convenience of integration of the wearable tracking device 130 in the vehicle and the cost of integration of the wearable tracking device 130 in the vehicle is reduced.

Figure 2:
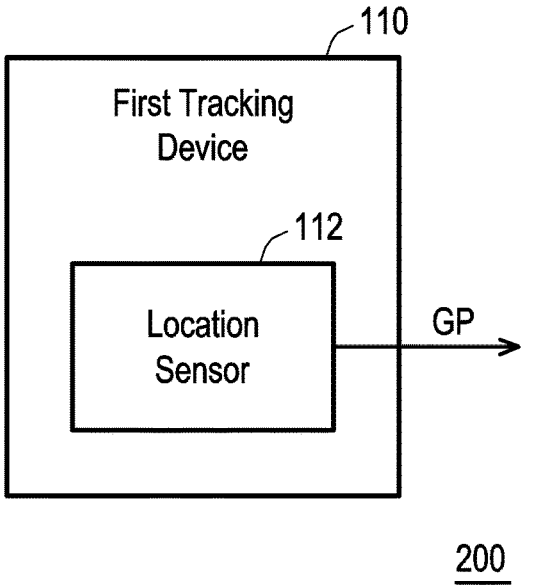
FIG. 2 is a schematic diagram of a vehicle positioning scenario according to an embodiment of the disclosure.

FIG. 2 is a schematic diagram of a vehicle positioning scenario according to an embodiment of the disclosure. With reference to FIG. 1 and FIG. 2, in a vehicle positioning scenario 200 the first tracking device 110 may include a location sensor 112.

In one embodiment, the map information of the first tracking device 110 may include a simultaneous localization and mapping (SLAM) map and the SLAM map may be obtained based on the location sensor 112. Further, the wearable tracking device 130 is configured to obtain global position information GP of the vehicle based on the SLAM map. It is worth mentioned that, the global position information GP of the vehicle indicates a location of the vehicle in the world.

In one embodiment, the location sensor 112 includes, for example, a camera, a light detection and ranging (LiDAR) device, a global positioning system (GPS) device, a radar, infrared sensor, an ultrasonic sensor, other similar devices, or a combination of these devices. The disclosure is not limited thereto. That is, the SLAM map may be obtained through a camera, a LiDAR device, a GPS device, a radar, infrared sensor, an ultrasonic sensor, other similar devices, or a combination of these devices. The disclosure is not limited thereto.

In one embodiment, the first tracking device 110 may include an exterior camera and the exterior camera is configured to obtain a plurality of exterior images outside the vehicle. Based on the plurality of exterior images, the SLAM map may be obtained. That is, a location of the vehicle may be obtained. Further, a movement of the vehicle may be also obtained based on the difference between the plurality of exterior images at a previous moment and the plurality of exterior images at a present moment.

In this manner, based on the location sensor 112 of the first tracking device 110, the location and the movement of the vehicle in the world may be obtained.

Figure 3A:
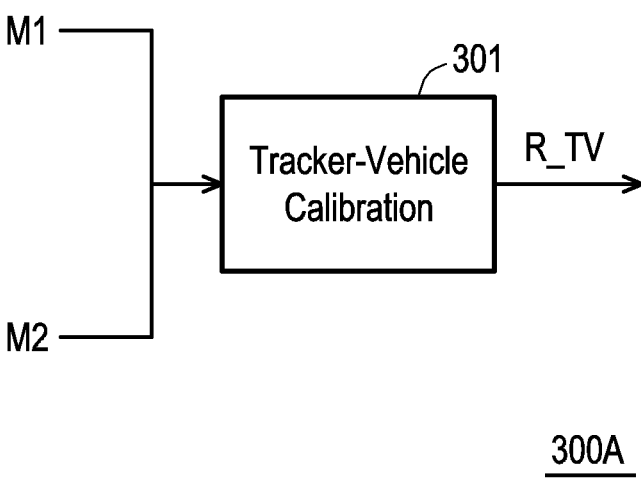
FIG. 3A is a schematic diagram of a calibration scenario according to an embodiment of the disclosure.
Figure 3B:
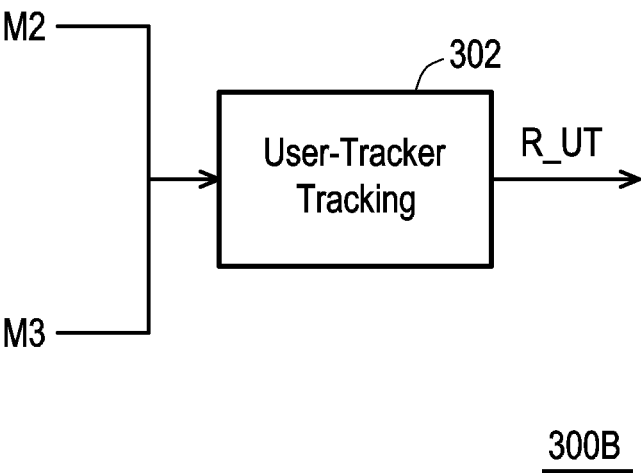
FIG. 3B is a schematic diagram of a tracking scenario according to an embodiment of the disclosure.

FIG. 3A is a schematic diagram of a calibration scenario according to an embodiment of the disclosure. FIG. 3B is a schematic diagram of a tracking scenario according to an embodiment of the disclosure. With reference to FIG. 1 to FIG. 3B, FIG. 3A depicts a calculation process of a tracker-vehicle pose relationship R_TV between the second tracking device 120 and the vehicle (the first tracking device 110) and FIG. 3B depicts a tracking process of a user-tracker pose relationship R_UT between the user (the wearable tracking device 130) and the second tracking device 120, wherein the pose relationship comprise a relative translation (position) relationship and a relative rotation relationship, but this disclosure is not limited thereto.

Referring to FIG. 3A, in a calibration scenario 300A, the first measurement information M1 and the second measurement information M2 are provided to a tracker-vehicle calibration 301 to obtain the tracker-vehicle pose relationship R_TV. The tracker-vehicle calibration 301 may be performed by the controller of the wearable tracking device 130, but this disclosure is not limited thereto. It is noted that, it is described in the embodiment for the sake of convenience in explanation that the second tracking device 120 may be a tracker, but this disclosure is not limited thereto.

In one embodiment, the tracker-vehicle pose relationship R_TV may indicate a relationship between a rotation value of the first tracking device 110 and a rotation value of the second tracking device 120. That is, with the rotation value of the first tracking device 110 and the rotation value of the second tracking device 120, the tracker-vehicle calibration 301 is configured to calibrate the relative rotation relationship from the first tracking device 110 to the second tracking device 120.

Specifically, the first tracking device 110 is configured to obtain a first rotation value of a first fixed position of the vehicle and the second tracking device 120 is configured to obtain a second rotation value of a second fixed position within the vehicle. The first rotation value of the first tracking device 110 may be represented by $^V\omega$ and the second rotation value of the second tracking device 120 may be represented by $^T\omega$, wherein $\omega$ stands for a rotation value, V stands for the vehicle (the first tracking device 110), and T stands for the tracker (the second tracking device 120). The first rotation value $^V\omega$ and the second rotation value $^T\omega$ may satisfy a rotation transformation equation $$^T\omega = R_V^T \times {}^V\omega,$$

wherein $$R_V^T$$

stands for the relative rotation relationship from the tracker to the vehicle. That is, $$R_V^T$$

also stands for the tracker-vehicle rotation relationship in the pose relationship R_TV. Hence, the tracker-vehicle rotation relationship $$R_V^T,$$

which is part of the tracker-vehicle pose relationship R_TV may be obtained based on the first rotation value $^V\omega$ (the first measurement information M1) and the second rotation value $^T\omega$ (the second measurement information M2).

In one embodiment, the tracker-vehicle pose relationship R_TV may indicate a relationship between a translation value of the first tracking device 110 and a translation value of the second tracking device 120. That is, with the translation value of the first tracking device 110 and the translation value of the second tracking device 120, the tracker-vehicle calibration 301 is configured to calibrate the relative translation relationship from the first tracking device 110 to the second tracking device 120.

Specifically, the first tracking device 110 is configured to obtain a first acceleration value of the first fixed position of the vehicle and the second tracking device 120 is configured to obtain a second acceleration value of the second fixed position within the vehicle. In detail, a first translation value of the first tracking device 110 in a global coordinate may be represented by $^G D_V$ and a second translation value of the second tracking device 120 in the global coordinate may be represented by $^G D_T$, wherein G stands for the global coordinate, D stands for a translation value, V stands for the vehicle (the first tracking device 110), and T stands for the tracker (the second tracking device 120). The first translation value $^GD_V$ and the second translation value $^GD_T$ may satisfy a translation transformation equation $$^GD_T = {}^G D_V + R_V^G \times D_T^V \qquad 5$$

wherein $$D_T^V$$

stands for the relative translation relationship from the vehicle V to the tracker T, and $$R_V^G$$

stands for the relative rotation relationship from the global coordinate G to the vehicle V. That is, $$D_V^T$$

also stands for the tracker-vehicle translation relationship in the pose relationship R_TV.

Further, the translation transformation equation may be differentiated twice to obtain an acceleration transformation equation $$^Ga_T = {}^G a_V + R_V^G * \left( [\omega_V]_x^2 + [\dot\omega_V]_x \right) * D_T^V,$$

wherein $^Ga_V$ stands for a first acceleration value of the vehicle V under the global coordinate G, $^Ga_T$ stands for a second acceleration value of the tracker T under the global coordinate G, a stands for an acceleration value, $[\omega]_x$ stands for representing a 3D vector (e.g., a rotation value) in a form of outer product and $\dot\omega$ stands for a first differential form of a 3D vector (e.g., a rotation value). Notably, the second acceleration value under the global coordinate G ($^Ga_T$) may be also obtained based on the second acceleration value under a coordinate of the tracker T ($^Ta_T$), and satisfy a conversion equation $$^Ga_T = R_T^G \times {}^T a_T - g,$$

wherein g stands for the acceleration of gravity. Therefore, the second acceleration value (of the tracker T) ($^Ta_T$) may further satisfy an equation $$^Ta_T = R_V^T \times {}^V a_V + R_V^T * \left( [\omega_V]_x^2 + [\dot\omega_V]_x \right) * D_T^V,$$

In this manner, the relative translation relationship $$D_T^V$$

between the first translation value of the first tracking device 110 and the second translation value of the second tracking device 120 may be obtained based on the relative rotation relationship $$R_V^T.$$

Hence, the tracker-vehicle translation relationship $$D_V^T,$$

which is part of the tracker-vehicle pose relationship R_TV, may be obtained based on the first acceleration value $^Va_V$, the first rotation value $\omega_V$ ($^V\omega$) (the first measurement information M1), and the second acceleration value $^Ta_T$ (the second measurement information M2).

In one embodiment, the tracker-vehicle pose relationship R_TV may be obtained based on three translation values in three perpendicular axes. In another embodiment, the tracker-vehicle pose relationship R_TV may be obtained based on three rotation values about the three perpendicular axes. In yet another embodiment, the tracker-vehicle pose relationship R_TV may be obtained based on three translation value in the three perpendicular axes and three rotation values about the three perpendicular axes. That is, this disclosure is not limited thereto.

It is worth mentioned that, based on the tracker-vehicle pose relationship R_TV, the wearable tracking device 130 is able to obtain a relative position between the first tracking device 110 and the second tracking device 120. Further, since the location and the movement of the first tracking device 110 may be obtained as the description of FIG. 2, the location and the movement of the second tracking device 120 may be also obtained based on the tracker-vehicle pose relationship R_TV.

Referring to FIG. 3B, in a tracking scenario 300B, the second measurement information M2 and the third measurement information M3 are provided to a user-tracker tracking 302 to obtain the user-tracker pose relationship R_UT. The user-tracker tracking 302 may be performed by the controller of the wearable tracking device 130, but this disclosure is not limited thereto.

In one embodiment, the user-tracker pose relationship R_UT may indicate a relationship between a rotation value of the second tracking device 120 and a rotation value of the wearable tracking device 130. In one embodiment, the user-tracker pose relationship R_UT may indicate a relationship between a translation value of the second tracking device 120 and a translation value of the wearable tracking device 130. In one embodiment, the user-tracker pose relationship R_UT is obtained based on three rotation values or three translation values of the second tracking device 120 and three rotation values or three translation values of the wearable tracking device 130, but this disclosure is not limited thereto. It is noted that, while the user is not moving in the vehicle, the calculation of the user-tracker pose relationship R_UT may be referred to the calculation of the tracker-vehicle pose relationship R_TV in FIG. 3A to obtain sufficient teachings, suggestions, and implementation embodiments, while the details are not redundantly described seriatim herein. Instead, while the user is moving in the vehicle, the calculation of the user-tracker pose relationship R_UT may utilize the second measurement information M2 of the second tracking device 120 as an anchor, thereby obtaining a movement of the user relative to the vehicle based on the third measurement information M3 of the wearable tracking device 130. In other words, the second measurement information M2 is utilized to cancel the influence of the movement of the vehicle from the third measurement information M3. In this manner, the user-tracker pose relationship R_UT may be obtained according an inertial tracking technique based on the measurement information M2 and the third measurement information M3.

In addition, the wearable tracking device 130 may include an interior camera. Instead of obtaining the user-tracker pose relationship R_UT according the inertial tracking technique, the user-tracker pose relationship R_UT may be also obtained according to a visual tracking technique. Specifically, the interior camera is configured to obtain a plurality of interior images inside the vehicle and at least one of the plurality of interior images includes an image of the tracker pattern of the second tracking device 120. Further, the wearable tracking device 130 is configured to obtain the plurality of interior images and obtain the user-tracker pose relationship R_UT based on the tracker pattern (in the at least one interior image). In this manner, the user-tracker pose relationship R_UT may be obtained according the visual tracking technique based on the plurality of interior images.

Moreover, the user-tracker pose relationship R_UT may be obtained according to both the inertial tracking technique and the visual tracking technique. That is, the wearable tracking device 130 is configured to obtain the user-tracker pose relationship R_UT based on the tracker pattern (in the at least one interior image), the second measurement information M2 and the third measurement information M3. In this manner, the accuracy of the user-tracker pose relationship R_UT may be improved.

It is worth mentioned that, based on the user-tracker pose relationship R_UT, the wearable tracking device 130 is able to obtain a relative pose between the second tracking device 120 and the wearable tracking device 130. Further, since the location and the movement of the first tracking device 110 may be obtained as the description of FIG. 2 and the location and the movement of the second tracking device 120 may be obtained as the description of FIG. 3A, the location and movement of the wearable tracking device 130 may be also obtained.

Figure 4:
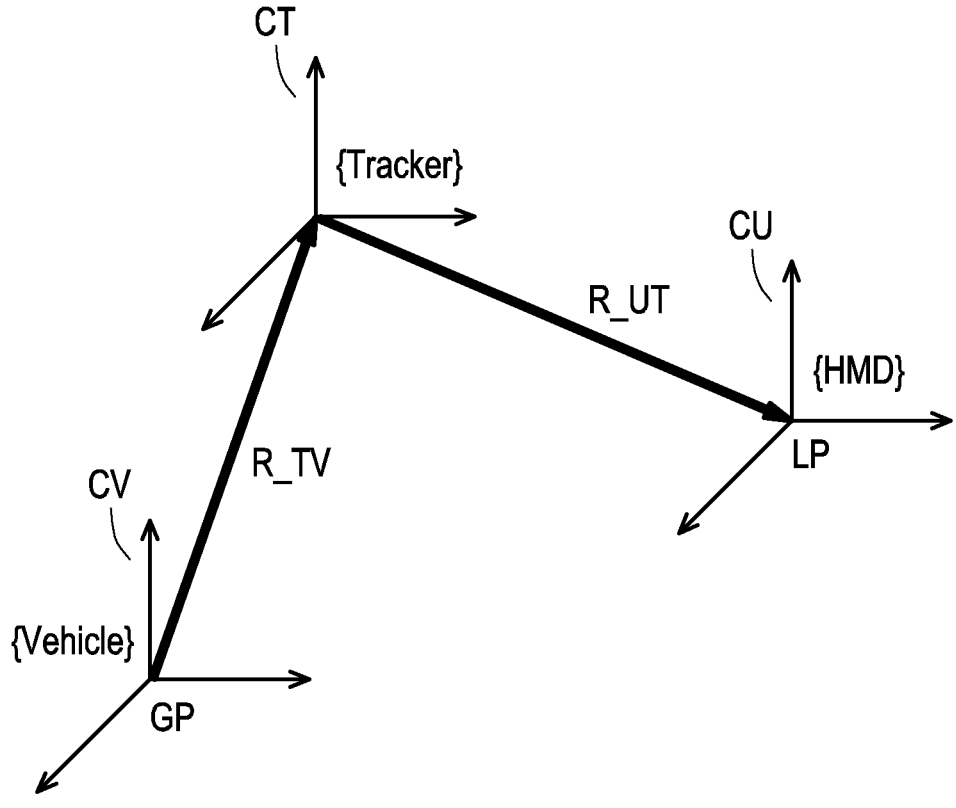
FIG. 4 is a schematic diagram of a conversion scenario according to an embodiment of the disclosure.

FIG. 4 is a schematic diagram of a conversion scenario according to an embodiment of the disclosure. With reference to FIG. 1 to FIG. 4, in a conversion scenario 400 is depicted a first conversion from a coordinate of the vehicle (the first tracking device 110) to a coordinate of the tracker (the second tracking device 120) and a second conversion from the coordinate of the tracker (the second tracking device 120) to a coordinate of a HMD (the wearable tracking device 130). It is noted that, it is described in the embodiment for the sake of convenience in explanation that the second tracking device 120 may be a tracker and the wearable tracking device 130 may be an HMD, but this disclosure is not limited thereto.

In FIG. 4, the coordinate of the vehicle is represented by a vehicle coordinate CV, the coordinate of the tracker is represented by a tracker coordinate CT, and the coordinate of the HMD is represented by a user coordinate CU. The vehicle coordinate CV may be established based on the first measurement information M1 of the first tracking device 110. The tracker coordinate CT may be established based on the second measurement information M2 of the second tracking device 120. The user coordinate CU may be established based on the third measurement information M3 of the wearable tracking device 130.

Further, the wearable tracking device 130 is configured to obtain global position information GP of the vehicle based on the map information of the first tracking device 110. It is worth mentioned that, the global position information GP of the vehicle indicates a location of the vehicle in the world. Furthermore, the first conversion from the vehicle coordinate CV to the tracker coordinate CT may be performed based on the tracker-vehicle pose relationship R_TV so as to obtain location of the tracker in the world. Moreover, the second conversion from the tracker coordinate CT to the user coordinate CU may be performed based on the user-tracker pose relationship R_UT so as to obtain location of the user in the world.

Since the locations of the vehicle, the tracker, and the user in the world are known, the action of the user within the vehicle may be obtained without the influence of the moving of the vehicle. In other words, the wearable tracking device 130 is configured to obtain the local position information LP based on the global position information GP, the tracker-vehicle pose relationship R_TV and the user-tracker pose relationship R_UT. Therefore, while the vehicle is moving, the false detection of the moving of the user may be prevented.

Figure 5:
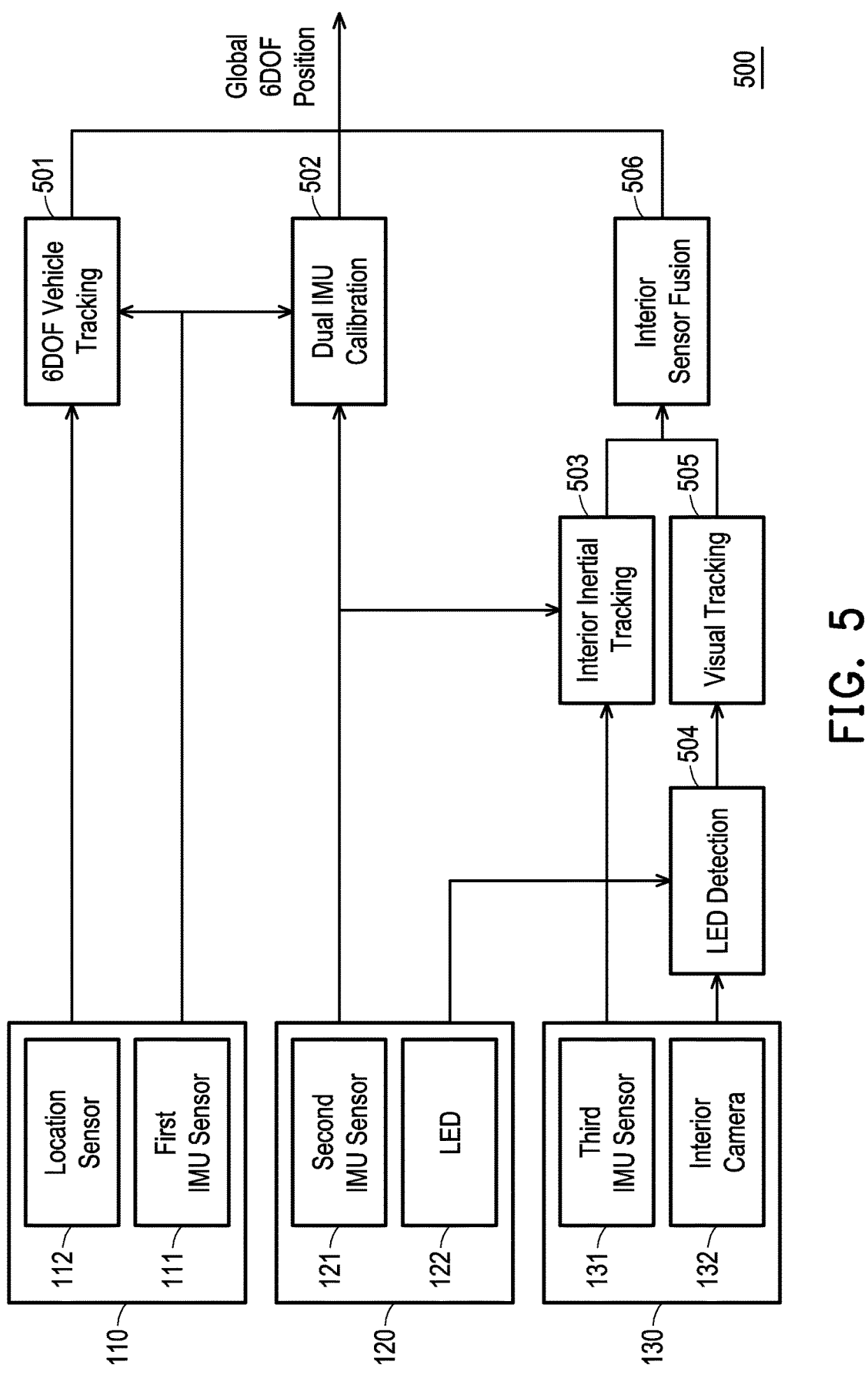
FIG. 5 is a schematic flowchart of a tracking method according to an embodiment of the disclosure.

FIG. 5 is a schematic flowchart of a tracking method according to an embodiment of the disclosure. With reference to FIG. 1 to FIG. 5, a tracking method 500 adapted to the tracking system 100 is depicted. The tracking method includes a plurality of processes 501-506, which may be performed by a controller of the tracking system 100. The controller may be disposed in the first tracking device 110, the second tracking device 120, the wearable tracking device 130, or other devices according to design need. While it is assumed in the embodiment for the sake of convenience in explanation that the controller is disposed in the wearable tracking device 130, it is to be noted that the controller is not limited to being disposed in the wearable tracking device 130.

In the embodiment, the tracking system 100 includes the first tracking device 110, the second tracking device 120, and the wearable tracking device 130. The first tracking device 110 may include a first IMU sensor 111 and a location sensor 112. The second tracking device 120 may include a second IMU sensor 121 and a LED 122. The wearable tracking device 130 may include a third IMU sensor and an interior camera 132. However, this disclosure is not limited thereto.

In the process 501, a six DOF vehicle tracking is performed based on the first IMU sensor 111 and the location sensor 112 of the first tracking device 110. Specifically, the first IMU sensor 111 is configured to obtain the first measurement information M1 (e.g., a first inertial measurement value) and the location sensor 112 is configured to obtain the map information. The first measurement information M1 and the map information are provided to the process 501 to obtain the SLAM map around the vehicle. Hence, based on the SLAM map, the six DOF vehicle tracking is achieved.

In the process 502, a dual IMU calibration is performed based on the first IMU sensor 111 of the first tracking device 110 and the second IMU sensor 121 of the second tracking device 120. Specifically, the first IMU sensor 111 is configured to obtain the first measurement information M1 (e.g., a first inertial measurement value) and the second IMU sensor 121 is configured to obtain the second measurement information M2 (e.g., a second inertial measurement value). The first measurement information M1 and the second measurement information M2 are provided to the process 502 to obtain a relationship between the first tracking device 110 and the second tracking device 120. It is noted that, the details of the process 502 may be referred to the tracker-vehicle calibration 301 in FIG. 3A, but this disclosure is not limited thereto.

In the process 503, an interior inertial tracking is performed based on the second IMU sensor 121 of the second tracking device 120 and the third IMU sensor 131 of the wearable tracking device 130. Specifically, the second IMU sensor 121 is configured to obtain the second measurement information M2 (e.g., a second inertial measurement value) and the third IMU sensor 131 is configured to obtain the third measurement information M3 (e.g., a third inertial measurement value). The second measurement information M2 and the third measurement information M3 are provided to the process 503 to obtain a relationship between the second tracking device 120 and the wearable tracking device 130 based on inertial measurement values. It is noted that, the details of the process 503 may be referred to the user-tracker tracking 302 in FIG. 3B, but this disclosure is not limited thereto. That is, the relationship between the second tracking device 120 and the wearable tracking device 130 may be obtained according to the inertial tracking technique in the process 503.

In the process 504, an LED detection is performed based on the LED 122 of the second tracking device 120 and the interior camera 132 of the wearable tracking device 130. The LED 122 is configured to provide a tracker pattern and the interior camera 132 is configured to obtain a plurality of interior images inside the vehicle. The tracker pattern and the plurality of interior images are provided to the process 504 to detect and identify the tracker pattern in at least one of the plurality of interior images.

In the process 505, a visual tracking is performed based on an identification result of the tracker pattern from the process 504. That is, the process 505 is configured to provide a relationship between the second tracking device 120 and the wearable tracking device 130 based on image recognition of the tracker pattern. In other words, instead of obtaining the relationship between the second tracking device 120 and the wearable tracking device 130 according to the inertial tracking technique in the process 503 (Interior Inertial Tracking), the relationship between the second tracking device 120 and the wearable tracking device 130 may be obtained according to the visual tracking technique in the process 505 (Visual Tracking).

In the process 506, an interior sensor fusion is performed based on the relationship between the second tracking device 120 and the wearable tracking device 130 based on inertial measurement values and the relationship between the second tracking device 120 and the wearable tracking device 130 based on image recognition of the tracker pattern. That is, an inertial tracking result of the process 503 (Interior Inertial Tracking) and a visual tracking result of the process 505 (Visual Tracking) are fused together to generate a fusion tracking result. Furthermore, the detail of the fusion of the inertial tracking result and the visual tracking result may be referred to the description of U.S. Provisional Application 63/398,523, filed Aug. 16, 2022. Hence, the accuracy of the relationship between the second tracking device 120 and the wearable tracking device 130 is enhanced.

In this manner, the tracking method 500 is able to provide a global six DOF position of the wearable tracking device

12

130. Hence, a user friendly and low cost integration system of the wearable tracking device 130 in the vehicle is achieved.

FIG. 6 is a schematic flowchart of a tracking method according to an embodiment of the disclosure. With reference to FIG. 1 to FIG. 6, a tracking method 600 adapted to the tracking system 100 includes a step S610, step S620, a step S630, and a step S640.

In the step S610, the tracking system 100 is configured to obtain, through the first tracking device 110 disposed on a vehicle, map information and first measurement information M1. In the step S620, the tracking system 100 is configured to obtain, through the second tracking device 120 disposed on the vehicle, second measurement information M2. In the step S630, the tracking system 100 is configured to obtaining, through the wearable tracking device 130 disposed on a user in the vehicle, third measurement information M3. In the step S640, the tracking system 100 is configured to obtaining local position information LP of the user based on the map information, the first measurement information M1, the second measurement information M2, and the third measurement information M3. The local position information LP indicates a user position of the user within the vehicle.

In addition, the implementation details of the tracking method 600 may be referred to the descriptions of FIG. 1 to FIG. 5 to obtain sufficient teachings, suggestions, and implementation embodiments, while the details are not redundantly described seriatim herein.

In this manner, the tracking method 600 is able to determine the position of the user in the vehicle while the vehicle is moving. Therefore, the convenience of integration of the wearable tracking device 130 in the vehicle and the cost of integration of the wearable tracking device 130 in the vehicle is reduced.

In summary, according to the tracking method 100 and the tracking method 600, while the vehicle is moving, the false detection of the moving of the user may be prevented. Further, the setup of the integration of the wearable device with the vehicle is not complicated and user-friendly. Furthermore, the cost of the integration of the wearable device with the vehicle is reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A tracking system, comprising:
a first tracking device, disposed on a vehicle and configured to obtain map information and first measurement information;
a second tracking device, disposed on the vehicle and configured to obtain second measurement information; and
a wearable tracking device, disposed on a user in the vehicle and configured to obtain third measurement information,
wherein the wearable tracking device is configured to obtain global position information of the vehicle based on the map information, obtain a tracker-vehicle pose relationship based on the first measurement information and the second measurement information, and obtain a user-tracker pose relationship based on the second measurement information and the third measurement information, wherein the wearable tracking device is further configured to obtain local position information of the user based on the global position information, the tracker-vehicle pose relationship, and the user-tracker pose relationship, wherein the local position information indicates a user position of the user within the vehicle.

2. The tracking system according to claim 1, wherein the map information comprises a simultaneous localization and mapping (SLAM) map, and the wearable tracking device is configured to:

obtain global position information of the vehicle based on the SLAM map.

3. The tracking system according to claim 2, wherein the SLAM map is obtained according to a plurality of exterior images outside the vehicle through an exterior camera of the first tracking device.

4. The tracking system according to claim 2, wherein the SLAM map is obtained through a light detection and ranging (LiDAR) device or a global positioning system (GPS) device.

5. The tracking system according to claim 1, wherein the first tracking device comprises a first inertial measurement unit (IMU) sensor and the first measurement information comprises a first inertial measurement value, the second tracking device comprises a second IMU sensor and the second measurement information comprises a second inertial measurement value, and the wearable tracking device comprises a third IMU sensor and the third measurement information comprises a third inertial measurement value.

6. The tracking system according to claim 5, wherein each of the first inertial measurement value, the second inertial measurement value, and the third inertial measurement value comprises changes in six degrees of freedom and the six degrees of freedom comprises three translation values corresponding to three perpendicular axes and three rotation values corresponding to the three perpendicular axes.

7. The tracking system according to claim 6, wherein the wearable tracking device is configured to:

obtain the tracker-vehicle pose relationship based on a tracker-vehicle difference between the three rotation values of the first inertial measurement value and the three rotation values of the second inertial measurement value; and obtain the user-tracker pose relationship based on a user-tracker difference between the three rotation values of the second inertial measurement value and the three rotation values of the third inertial measurement value.

8. The tracking system according to claim 1, wherein the second tracking device is configured to provide a tracker pattern, the wearable tracking device comprises an interior camera, the wearable tracking is configured to:

obtain, from the interior camera, a plurality of interior images, wherein at least one of the plurality of interior images comprises an image of the tracker pattern; and obtain the user-tracker pose relationship based on the tracker pattern, the second measurement information and the third measurement information.

9. The tracking system according to claim 8, wherein the tracker pattern comprises at least one of a predetermined pattern, an ava group of the university of Cordoba (ArUco) marker, and a light emitting device.

10. A tracking method, comprising:

obtaining, through a first tracking device disposed on a vehicle, map information and first measurement information;

obtaining, through a second tracking device disposed on the vehicle, second measurement information;

obtaining, through a wearable tracking device disposed on a user in the vehicle, third measurement information;

obtaining global position information of the vehicle based on the map information;

obtaining a tracker-vehicle pose relationship based on the first measurement information and the second measurement information;

obtaining a user-tracker pose relationship based on the second measurement information and the third measurement information; and obtaining local position information of the user based on the global position information, the tracker-vehicle pose relationship, and the user-tracker pose relationship, wherein the local position information indicates a user position of the user within the vehicle.

11. The tracking method according to claim 10, wherein the map information comprises a simultaneous localization and mapping (SLAM) map, and the tracking method further comprises:

obtain global position information of the vehicle based on the SLAM map.

12. The tracking method according to claim 2, further comprising:

obtaining the SLAM map according to a plurality of exterior images outside the vehicle through an exterior camera of the first tracking device.

13. The tracking method according to claim 11, further comprising:

Obtaining the SLAM map through a light detection and ranging (LiDAR) device or a global positioning system (GPS) device.

14. The tracking method according to claim 10, wherein the first tracking device comprises a first inertial measurement unit (IMU) sensor and the first measurement information comprises a first inertial measurement value, the second tracking device comprises a second IMU sensor and the second measurement information comprises a second inertial measurement value, and the wearable tracking device comprises a third IMU sensor and the third measurement information comprises a third inertial measurement value.

15. The tracking method according to claim 14, wherein each of the first inertial measurement value, the second inertial measurement value, and the third inertial measurement value comprises changes in six degrees of freedom and the six degrees of freedom comprises three translation values corresponding to three perpendicular axes and three rotation values corresponding to the three perpendicular axes.

16. The tracking method according to claim 15, further comprising:

obtaining the tracker-vehicle pose relationship based on a tracker-vehicle difference between the three rotation values of the first inertial measurement value and the three rotation values of the second inertial measurement value;

obtaining the user-tracker pose relationship based on a user-tracker difference between the three rotation values of the second inertial measurement value and the three rotation values of the third inertial measurement value.

17. The tracking method according to claim 10, further comprising:

providing, through the second tracking device, a tracker pattern;

obtaining, from an interior camera of the wearable tracking device, a plurality of interior images, wherein at least one of the plurality of interior images comprises an image of the tracker pattern; and obtaining the user-tracker pose relationship based on the tracker pattern, the second measurement information and the third measurement information.

18. The tracking method according to claim 17, wherein the tracker pattern comprises at least one of a predetermined pattern, an ava group of the university of Cordoba (ArUco) marker, and a light emitting device.

\* \* \* \* \*